(12) United States Patent
Shah et al.

(10) Patent No.: US 8,964,045 B2
(45) Date of Patent: Feb. 24, 2015

(54) IMAGE BLUR DETECTION

(75) Inventors: Chintan Anil Shah, Boulder, CO (US); Wolfgang M. Schickler, Broomfield, CO (US); Maksim Lepikhin, Boulder, CO (US); Corey Benjamin Goff, Jr., Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 49 days.

(21) Appl. No.: 13/362,849

(22) Filed: Jan. 31, 2012

(65) Prior Publication Data
US 2013/0194486 A1 Aug. 1, 2013

(51) Int. Cl.
*H04N 5/228* (2006.01)
*H04N 5/232* (2006.01)

(52) U.S. Cl.
USPC .............. 348/208.4; 348/352; 348/208.99

(58) Field of Classification Search
CPC .......... H04N 5/23248; H04N 5/23251; H04N 5/23254; H04N 5/23258; H04N 5/23261; H04N 5/23264
USPC ............... 348/208.99, 208.4, 208.12, 208.1, 348/208.2, 362, 240.3, 46, 352
See application file for complete search history.

(56) References Cited

U.S. PATENT DOCUMENTS

| | | | |
|---|---|---|---|
| 5,798,786 A | 8/1998 | Lareau et al. | |
| 6,122,446 A | 9/2000 | Satoh | |
| 6,548,800 B2 | 4/2003 | Chen et al. | |
| 6,888,566 B2 | 5/2005 | Larkin et al. | |
| 7,561,186 B2 | 7/2009 | Poon | |
| 8,493,454 B1* | 7/2013 | Kohn et al. | 348/208.6 |
| 2002/0107658 A1* | 8/2002 | McCall et al. | 702/141 |
| 2005/0047672 A1* | 3/2005 | Ben-Ezra et al. | 382/255 |
| 2006/0023073 A1* | 2/2006 | Li et al. | 348/211.99 |
| 2007/0003261 A1* | 1/2007 | Yamasaki | 396/55 |
| 2007/0064099 A1* | 3/2007 | Balter et al. | 348/51 |
| 2007/0071424 A1* | 3/2007 | Poon et al. | 396/52 |
| 2008/0031514 A1* | 2/2008 | Kakinami | 382/154 |
| 2008/0063294 A1* | 3/2008 | Burt et al. | 382/255 |
| 2008/0117296 A1* | 5/2008 | Egnal et al. | 348/143 |
| 2009/0027508 A1* | 1/2009 | Miki et al. | 348/208.99 |

(Continued)

OTHER PUBLICATIONS

"Airborne sensors", Retrieved at <<http://www.aerometrex.com.au/services_DAA_aerial_sensors.html>>, Retrieved Date: Nov. 25, 2011, pp. 3.

(Continued)

*Primary Examiner* — Sinh Tran
*Assistant Examiner* — Xi Wang
(74) *Attorney, Agent, or Firm* — Steven Spellman; Jim Ross; Micky Minhas

(57) ABSTRACT

Among other things, one or more techniques and/or systems are provided for quantifying blur of an image. Blur may result due to motion of a camera while the image is captured. Accordingly, motion measurement data corresponding to motion of the camera during an exposure event may be used to create a camera rotation matrix. A camera intrinsic matrix may be obtained based upon a focal length and principle point of the camera. A transformation matrix may be estimated based upon the camera rotation matrix and/or the camera intrinsic matrix. The transformation matrix may be applied to pixels within the image to determine a blur metric for the image. In this way, blur of an image may be quantified offline and/or in real-time during operation of the camera (e.g., so that the image may be re-acquired (e.g., on the fly) if the image is regarded as being overly blurry).

20 Claims, 11 Drawing Sheets

(56) References Cited

U.S. PATENT DOCUMENTS

2010/0315520 A1    12/2010  Noto et al.
2010/0321510 A1*   12/2010  Tsutsumi .................. 348/208.4
2011/0234840 A1*   9/2011   Klefenz et al. ............. 348/222.1

OTHER PUBLICATIONS

Rosenbaum, et al., "Towards automatic near real-time traffic monitoring with an airborne wide angle camera system" Retrieved at <<http://www.springerlink.com/content/lt148214185810q3/fulltext.pdf>>, Proceedings of European Conference of Transport Research Institutes, Dec. 7, 2008, pp. 11-21.

Horstmeyer, Roarke, "Camera Motion Tracking for Deblurring and Identification", Retrieved at <<http://web.media.mit.edu/~roarkeh/cameramotion_RWH.pdf>>, Proceedings of MIT Media Lab MAS 863 Final Project, May 2010, pp. 1-7.

Gülch, E., "Photogrammetric Evaluation of Multi-Temporal Fixed Wing UAV Imagery", Retrieved at <<http://www.isprs.org/proceedings/XXXVIII/1-C22/papers/guelch.pdf>>, Proceedings of International Conference on Unmanned Aerial Vehicle in Geomatics, Sep. 16, 2011, pp. 1-6.

Kontoes, et al., "SITHON: An Airborne Fire Detection System Compliant with Operational Tactical Requirements", Retrieved at <<www.mdpi.com/1424-8220/9/2/1204/pdf>>, Proceedings of Sensors 2009, 9(2), Feb. 24, 2009, pp. 1204-1220.

Brunner, et al., "Visual Metrics for the Evaluation of Sensor Data Quality in Outdoor Perception", Retrieved at <<www.asmemesa.org/IJICS/files/214/ijics2010.pdf>>, Proceedings of International Journal of Intelligent Control and Systems, 16(2), Jun. 2011, pp. 142-159.

Joshi, et al., "Image Deblurring using Inertial Measurement Sensors", Retrieved at <<http://research.microsoft.com/pubs/132794/imu_deblurring.pdf>>, Proceedings of SIGGRAPH '10 ACM SIGGRAPH 2010 papers, Jul. 2010, pp. 1-8.

* cited by examiner

IMAGE BLUR DETECTION

BACKGROUND

Many services and applications provide functionality associated with images captured by cameras. In one example, an online mapping service may provide users with interactive maps derived from images captured by cameras mounted on aircrafts, vehicles, and/or satellites. In another example, a web search engine may provide users with search results comprising one or more images captured by cameras. Unfortunately, many images acquired by cameras may suffer from blur. For example, blur may occur due to motion of a camera while an image is captured (e.g., a camera mounted to an aircraft may experience three-dimensional movement due to turbulent motion experience by the aircraft during image capture). Substantial blur within an image may render the image unusable for certain applications/functions.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, one or more systems and/or techniques for determining a blur metric for an image are provided herein. A camera may be associated with a device configured to measure motion of the camera. For example, an inertial measurement unit (IMU) may be configured to measure angular motion of the camera, such as camera roll, camera pitch, and/or camera heading (e.g., measurements may be captured at 200 Hz). Such information may be received as motion measurement data. The motion measurement data may be used to create a camera rotation matrix (e.g., camera rotation matrix 306 of FIG. 3). The camera rotation matrix may define an angular difference (e.g., displacement) of the camera between a shutter open event (e.g., a time at which the camera starts to capture an image) and a shutter close event (e.g., a time at which the camera finishes capturing the image) of an image captured by the camera during an exposure event. In one example, the motion measurement data may be interpolated to obtain shutter open camera orientation angles (e.g., pitch, roll, and/or heading orientation angles of the camera corresponding to the time of the shutter open event) and/or shutter close camera orientation angles (e.g., pitch, roll, and/or heading orientation angles of the camera corresponding to the time of the shutter close event). The camera rotation matrix may be created based upon an angular difference between the shutter open camera orientation angles and the shutter close camera orientation angles. In this way, the camera rotation matrix may be used to take into account motion of the camera during the exposure event of the image when determining the blur metric for the image.

A camera intrinsic matrix (e.g., camera intrinsic matrix 406 of FIG. 4) comprising conversion information for converting between image plane coordinates (e.g., x/y image coordinates) and object coordinates (e.g., X/Y/Z location coordinates of an object/scene depicted within the image) may be obtained. The camera intrinsic matrix may be based upon a camera focal length (e.g., an attribute of a camera lens associated with image magnification and/or angle of view for the camera) and/or a principle point associated with the camera (e.g., the principle point may take into account off centeredness between the center of the camera lens and the center of the image).

A transformation matrix (e.g., transformation matrix 508 of FIG. 5) may be estimated based upon the camera rotation matrix and/or the camera intrinsic matrix. For example, the transformation matrix may be a function of the camera rotation matrix (e.g., to take into account displacement of the camera during the exposure event of the image) and/or the camera intrinsic matrix (e.g., so that calculations may be performed in image space using pixel units/coordinates). The transformation matrix may be applied to ending image coordinates of a pixel (e.g., $(x_{sc}, y_{sc})$ corresponding to pixel coordinates of the pixel at the shutter close event, which may be obtained from the image, to obtain starting image coordinates of the pixel (e.g., $(x_{so}, y_{so})$ corresponding to pixel coordinates of the pixel at the shutter open event, which otherwise may not be apparent from the image). A pixel displacement for the pixel may be determined based upon comparing the ending image coordinates and the beginning image coordinates of the pixel. For example, a Euclidean distance between starting image coordinates of the pixel at the shutter open event and ending image coordinates of the pixel at the shutter close event may be determined as the pixel displacement. It may be appreciated that pixel displacement may be measured using a variety of measurement techniques, and is not limited to merely a Euclidean distance measurement. A blur metric for the pixel may be determined based upon the pixel displacement (e.g., the blur metric may be a function of a distance the pixel is displaced between the shutter open event and the shutter close event, which may be due to the motion of the camera).

Blur metrics may be determined for respective pixels within the image. In this way, a blur metric for the image may be determined (e.g., the blur metric for the image may be a maximum pixel displacement for respective pixels). Accordingly, the amount of blur for the image may be quantifiable in real-time during operation of the camera and/or offline after operation of the camera. For example, if the blur metric for the image exceeds an acceptance threshold amount of blur, then a notification may be provided to an operator of the camera (e.g., an instruction may be provided to a pilot of an aircraft comprising the camera to perform a re-flight to recapture the image).

It may be appreciated that blur metrics may be determined for images associated with a variety of imaging devices for which motion measurement data may be obtained. For example, a blur metric may be determined for a hand-held camera (e.g., a digital camera, an SLR camera, a smart phone camera, and/or other cameras for which motion measurement data may be available, such as through an accelerometer, gyroscope, etc.), a vehicle mounted camera, an aerial mounted camera, a satellite mounted camera, a video camera, an image scanner (e.g., a camera may be interpreted as a scanner such as used in document imaging, etc.). Accordingly, the instant application, including the scope of the appended claims, is not intended to be limited to the examples provided herein (e.g., not limited to determining blur metrics for aerial mounted cameras, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
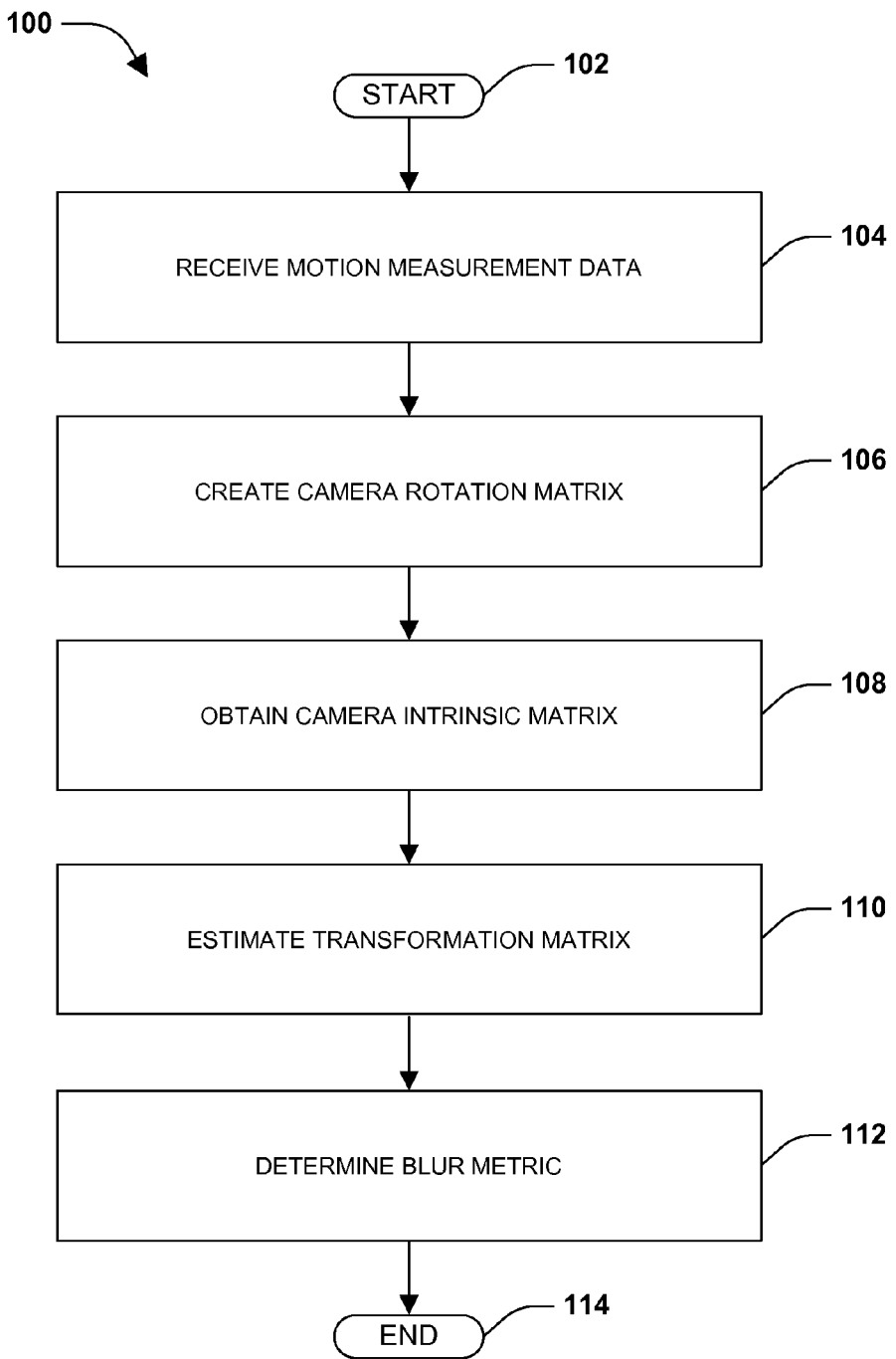
FIG. 1 is a flow chart illustrating an exemplary method of determining a blur metric for an image.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Images captured by cameras may suffer from blur due to camera motion during exposure events. For example, a camera may be mounted to an aircraft in order to capture a series of images of a city. The camera may experience three-dimensional motion while one or more images are captured by the camera (e.g., turbulence experienced by the aircraft may result in three-dimensional camera motion during an exposure event, which may result in a blurred image). It may be advantageous to identify blurred images so that such images may be discarded and/or recaptured as desired. Manual examination of the images for blur may be a cumbersome task if the series of images comprises a significant number of images (e.g., it may be a daunting task for a user to manually examine thousands of images for blur). Conventional blur detection techniques may utilize a modular transfer function that may estimate blur based upon the presence of straight edges in an image scene. Unfortunately, the modular transfer function may require the image scene to comprise straight edges, which may not be available. Furthermore, the blur estimate may be a relative value (e.g., the modular transfer function may merely indicate blur as a comparison between a first image and a second image). Moreover, because the modular transfer function is computationally intensive, real-time blur analysis of images may not be available.

Accordingly, one or more systems and/or techniques for determining a blur metric for an image are provided herein. The blur metric may be determined offline and/or in real-time (e.g., determined during operation of the camera, such that a notification may be provided to an operator of the camera when a blur metric for an image exceeds an acceptable threshold). The blur metric may be based upon motion measurement data associated with a camera (e.g., an inertial measurement unit (IMU) may measure camera roll orientation angles, camera pitch orientation angles, and/or camera heading orientation angles as angular motion information for inclusion within the motion measurement data). In particular, a camera rotation matrix may be created based upon the motion measurement data, which may be used in determining the blur metric. The camera rotation matrix (e.g., to take into account motion of the camera during an exposure event) and/or a camera intrinsic matrix (e.g., so that calculations may be performed in an image plane using pixel units/coordinates) may be used to estimate a transformation matrix. The transformation matrix may be used to determine pixel displacement of pixels within the image (e.g., a difference in location of a pixel at a shutter open event and a shutter close event). The blur metric for the image may be determined based upon one or more pixel displacements (e.g., the blur metric may be identified as a maximum pixel displacement). In this way, blur of the image may be quantified by the blur metric.

One embodiment of determining a blur metric for an image is illustrated by an exemplary method 100 in FIG. 1. At 102, the method starts. At 104, motion measurement data associated with a camera may be received. For example, the motion measurement data may comprise angular motion information associated with a camera roll orientation angle, a camera pitch orientation angle, a camera heading orientation angle, etc. The motion measurement data may have been captured by a motion measurement device, such as an inertial measurement unit (IMU) (e.g., operating at 200 Hz), associated with the camera. The motion measurement data may be associated with an exposure event of an image. The exposure event may correspond to a shutter open event (e.g., when the camera begins to capture the image) and a shutter close event (e.g., when the camera finishes capturing the image). In one example, the motion measurement data may not correspond directly to a time of the shutter open event and/or a time of the shutter close event. Accordingly, the motion measurement data may be interpolated to identify motion measurement data corresponding to the time of the shutter open event and/or motion measurement data corresponding to the time of the shutter close event. For example, the motion measurement data may be interpolated to obtain shutter open camera orientation angles and/or shutter close camera orientation angles.

At 106, a camera rotation matrix (e.g., camera rotation matrix 306 of FIG. 3) may be created based upon the motion measurement data. The camera rotation matrix may define an angular difference (e.g., displacement) of the camera between the shutter open event and the shutter close event of the image captured by the camera. For example, the camera rotation matrix may be created by comparing shutter open camera orientation angles with shutter close camera orientation angles. In this way, the camera rotation matrix may be utilized in determining the blur metric to take into account motion of the camera during the exposure event.

At 108, a camera intrinsic matrix (e.g., camera intrinsic matrix 406 of FIG. 4) may be obtained. The camera intrinsic matrix may comprise conversion information between image plane coordinates (e.g., x/y pixel coordinates) and object coordinates (e.g., X/Y/Z location coordinates of an object/scene depicted within the image). The camera intrinsic matrix may be based upon a camera focal length (e.g., an attribute of a camera lens associated with image magnification and/or angle of view for the camera) and/or a principle point associated with the camera (e.g., the principle point may take into account off centeredness between the center of the camera lens and the center of the image). In this way, the camera intrinsic matrix may be utilized in determining the blur metric to convert between image plane coordinates and object coordinates (e.g., calculations may be performed within the image plane using pixel units/coordinates).

At 110, a transformation matrix (e.g., transformation matrix 508 of FIG. 5) may be estimated. The transformation matrix may be based upon the camera rotation matrix (e.g., to take into account motion of the camera during the exposure event of the image) and/or the camera intrinsic matrix (e.g., so that pixel coordinates within the image plane may be utilized in determining the blur metric). At 112, the blur metric may be determined for the image based upon applying the transformation matrix to one or more pixels of the image. For example, the transformation matrix may be applied to ending image coordinates of a pixel at the shutter close event to identify beginning image coordinates of the pixel at the shutter open event. That is, ending image coordinates of the pixel at the shutter close event may be evident from the image (e.g., the pixel may be depicted within the image at ending image coordinates (4, 5)). The transformation matrix may be utilized to determine the beginning image coordinates of the pixel at the shutter open event, which may not be apparent from merely the image (e.g., the transformation matrix may determine that the pixel was located at (3, 3) at the shutter open event). A pixel displacement for the pixel may be determined based upon the ending image coordinates and the beginning image coordinates of the pixel. For example, a Euclidean distance between the ending image coordinates and the beginning image coordinates may be calculated as the pixel displacement (e.g., pixel displacement of 2.24 may be determined based upon $\sqrt{(4-3)^2+(5-3)^2}$).

Pixel displacements may be determined for one or more pixels within the image using the transformation matrix. The blur metric for the image may be determined based upon one or more of the pixel displacements. In one example, the blur metric may be a function of a maximum pixel displacement. It may be appreciated that the blur metric is not limited to a maximum pixel displacement, but may be based upon other evaluations of the pixel displacements, such as an average pixel displacement, etc., for example. In this way, the blur metric may quantify blur of the image. The blur metric may be determined offline and/or in real-time during operation of the camera. The blur metric may be compared to an acceptance threshold to determine whether the blur of the image exceeds such a threshold. If the blur metric exceeds the acceptance threshold, then the image may be discarded and/or a notification to recapture the image may be provided (e.g., a notification in real-time may be provided to an operator of the camera). At 114, the method ends.

Figure 2:
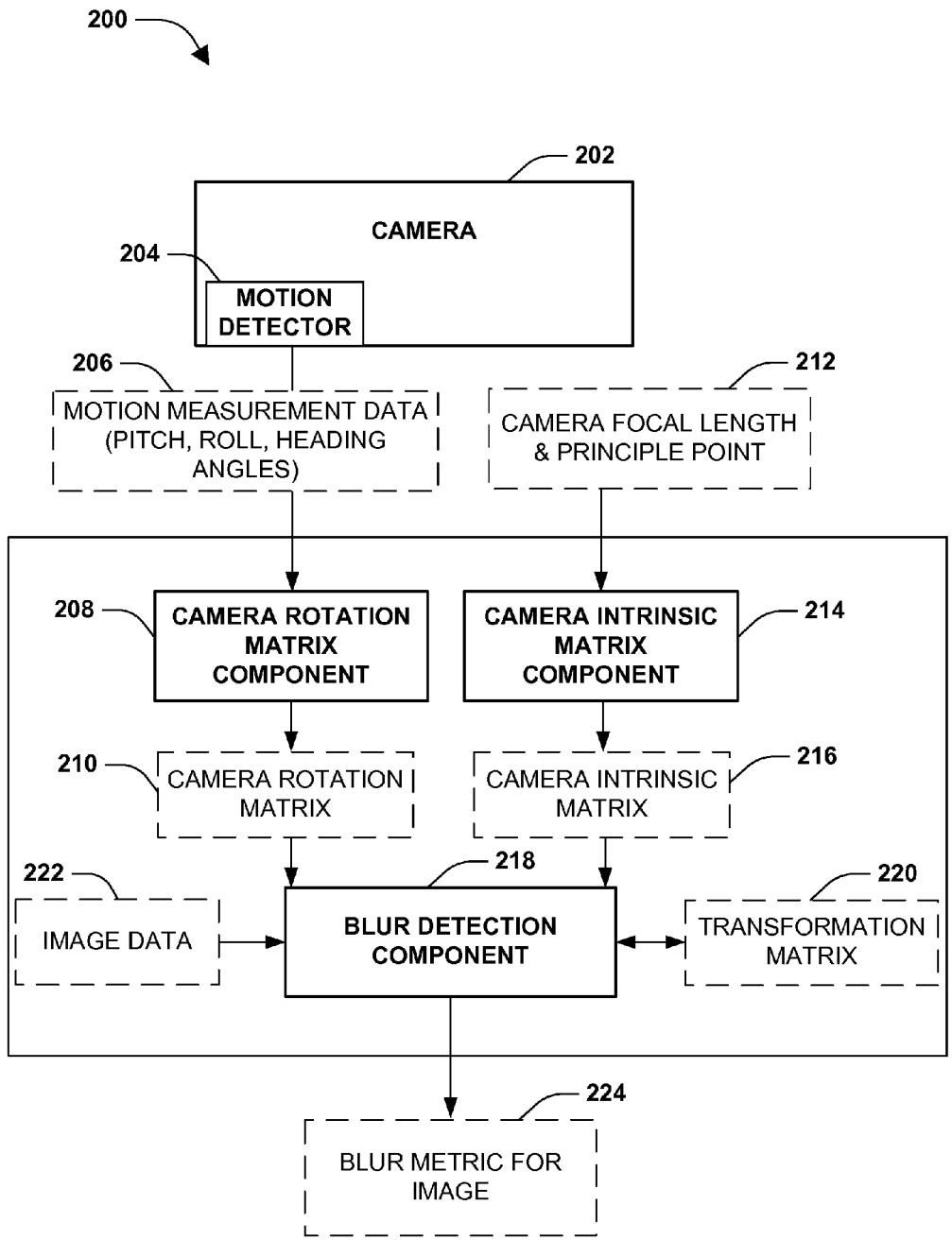
FIG. 2 is a component block diagram illustrating an exemplary system for determining a blur metric for an image.

FIG. 2 illustrates an example of a system 200 configured for determining a blur metric 224 for an image. The system 200 may comprise a camera rotation matrix component 208, a camera intrinsic matrix component 214, and/or a blur detection component 218. The camera rotation matrix component 208 may be configured to receive motion measurement data 206 associated with a camera 202. In one example where the blur metric 224 is determined in real-time, the motion measurement data 206 may be received from a motion detector 204 associated with the camera 202 (e.g., an inertial measurement unit (IMU)). In another example where the blur metric 224 is determined offline, the motion measurement data 206 may be accessible to the camera rotation matrix component 208 (e.g., from a database and/or file). The motion measurement data 206 may comprise angular motion information associated with the camera 202, such as a camera roll orientation angle, a camera pitch orientation angle, a camera heading orientation angle, etc.

The camera rotation matrix component 208 may be configured to identify motion measurement data associated with an exposure event of the image (e.g., motion measurement data associated with a shutter open event and/or a shutter close event). For example, the camera rotation matrix component 208 may be configured to interpolate the motion measurement data 206 to obtain shutter open camera orientation angles (e.g., pitch, roll, and/or heading angles of the camera during the shutter open event) and/or shutter close camera orientation angles (e.g., pitch, roll, and/or heading angles of the camera during the shutter close event). The camera rotation matrix component 208 may be configured to create a camera rotation matrix 210 based upon the motion measurement data 206. For example, the camera rotation matrix component 208 may create the camera rotation matrix 210 based upon an angular difference between the shutter open camera orientation angles and the shutter close camera orientation angles. In this way, the camera rotation matrix component 208 may create the camera rotation matrix 210 defining an angular difference of the camera 202 between the shutter open event and the shutter close event of the image.

The camera intrinsic matrix component 214 may be configured to obtain a camera intrinsic matrix 216. The camera intrinsic matrix 216 may comprise conversion information between image plane coordinates (e.g., x/y pixel coordinates of the image) and object coordinates (e.g., X/Y/Z location coordinates of an object/scene depicted within the image) based upon a camera focal length and a principle point 212, for example, associated with the camera 202.

The blur detection component 218 may be configured to estimate a transformation matrix 220 based upon the camera rotation matrix 210 (e.g., to take into account motion of the camera 202 during the exposure event of the image) and/or the camera intrinsic matrix 216 (e.g., so that pixel coordinates within an image plane may be utilized in determining the blur metric 224). The blur detection component 218 may utilize the transformation matrix 220 in determining the blur metric 224 for the image. For example, the blur detection component 218 may apply the transformation matrix 220 to image data 222, such as ending image coordinates of pixels within the image at the shutter close event, to identify beginning image coordinates of pixels at the shutter open event. That is, the blur detection component 218 may apply the transformation matrix 220 to one or more pixels within the image (e.g., ending image coordinates specified within the image data 222) in order to identify beginning image coordinates of the one or more pixels. The blur detection component 218 may be configured to determine pixel displacements for the one or more pixels. For example, a pixel displacement of a pixel may be determined based upon comparing ending image coordinates of the pixel to starting image coordinates of the pixel (e.g., a Euclidean distance may be calculated to determine pixel displacement).

The blur detection component 218 may determine the blur metric 224 for the image based upon one or more pixel displacements. In one example, the blur metric 224 may correspond to a maximum pixel displacement of pixels within the image. In another example, the blur metric 224 may correspond to an average pixel displacement of pixels within the image (although the blur metric is not limited to being determined in this manner, and the instant application, including the scope of the appended claims, is not meant to be so limited). In this way, the blur metric 224 may quantify blur of the image. The blur detection component 218 may be configured to compare the blur metric 224 with an acceptance threshold to determine whether to retain, discard, and/or provide a notification regarding blur of the image (e.g., an operator of the camera may be provided with a notification to retake the image if the blur metric 224 exceeds the acceptance threshold).

Figure 3:
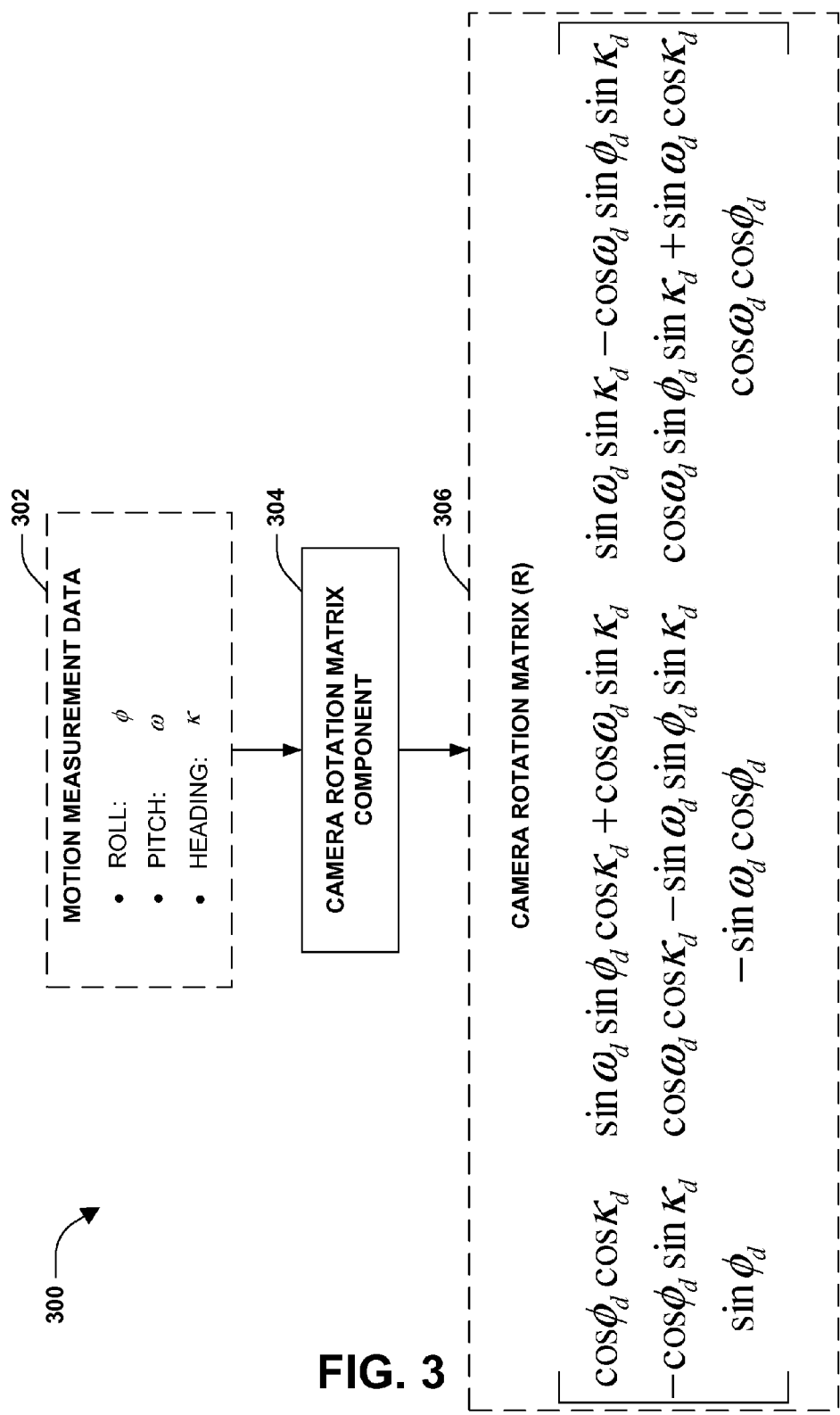
FIG. 3 is an illustration of an example of a camera rotation matrix.

FIG. 3 illustrates an example 300 of a camera rotation matrix 306. A camera rotation matrix component 304 may be configured to receive motion measurement data 302 associated with a camera. The motion measurement data 302 may comprise camera roll orientation angles (e.g., roll angle $\phi$, which may correspond to angular rotation along an axis passing through a front side and a back side of the camera (e.g., substantially parallel to an image plane, substantially parallel to the ground, etc.), camera pitch orientation angles (e.g., pitch angle $\omega$, which may correspond to an angular rotation along an axis passing through a first side and a second side of the camera), and/or camera heading orientation angles (e.g., heading angle $\kappa$, which may correspond to angular rotation along a top and a bottom of the camera (e.g., substantially perpendicular to an image plane, substantially perpendicular to the ground, etc.).

The camera rotation matrix component 304 may be configured to create the camera rotation matrix 306 based upon the motion measurement data 302 (e.g., angular differences in roll angle $\phi$, pitch angle $\omega$, and heading angle $\kappa$ between a shutter open event and a shutter close event for the image). For example, a roll angle difference $\phi_d$ may be determined based upon calculating a difference between a roll angle $\phi_{so}$ at the shutter open event and a roll angle $\phi_{sc}$ at the shutter close event. A pitch angle difference $\omega_d$ may be determined based upon calculating a difference between a pitch angle $\omega_{so}$ at the shutter open event and a pitch angle $\omega_{sc}$ at the shutter close event. A heading angle difference $\kappa_d$ may be determined based upon calculating a difference between a heading angle $\kappa_{so}$ at the shutter open event and a heading angle $\kappa_{sc}$ at the shutter close event. The camera rotation matrix component 304 may utilize the roll angle difference $\phi_d$, the pitch angle difference $\omega_d$, and the heading angle difference $\kappa_d$ to create the camera rotation matrix 306:

$$\begin{bmatrix} \cos\phi_d \cos\kappa_d & \sin\omega_d \sin\phi_d \cos\kappa_d + \cos\omega_d \sin\kappa_d & \sin\omega_d \sin\kappa_d - \cos\omega_d \sin\phi_d \sin\kappa \\ -\cos\phi_d \sin\kappa_d & \cos\omega_d \cos\kappa_d - \sin\omega_d \sin\phi_d \sin\kappa_d & \cos\omega_d \sin\phi_d \sin\kappa_d + \sin\omega_d \cos\kappa_d \\ \sin\phi_d & -\sin\omega_d \cos\phi_d & \cos\omega_d \cos\phi_d \end{bmatrix}.$$

The camera rotation matrix 306 may define an angular difference of the camera between the shutter open event and the shutter close event of the image (e.g., three-dimensional motion of the camera during the exposure event of the image, which may result in blur of the image).

Figure 4:
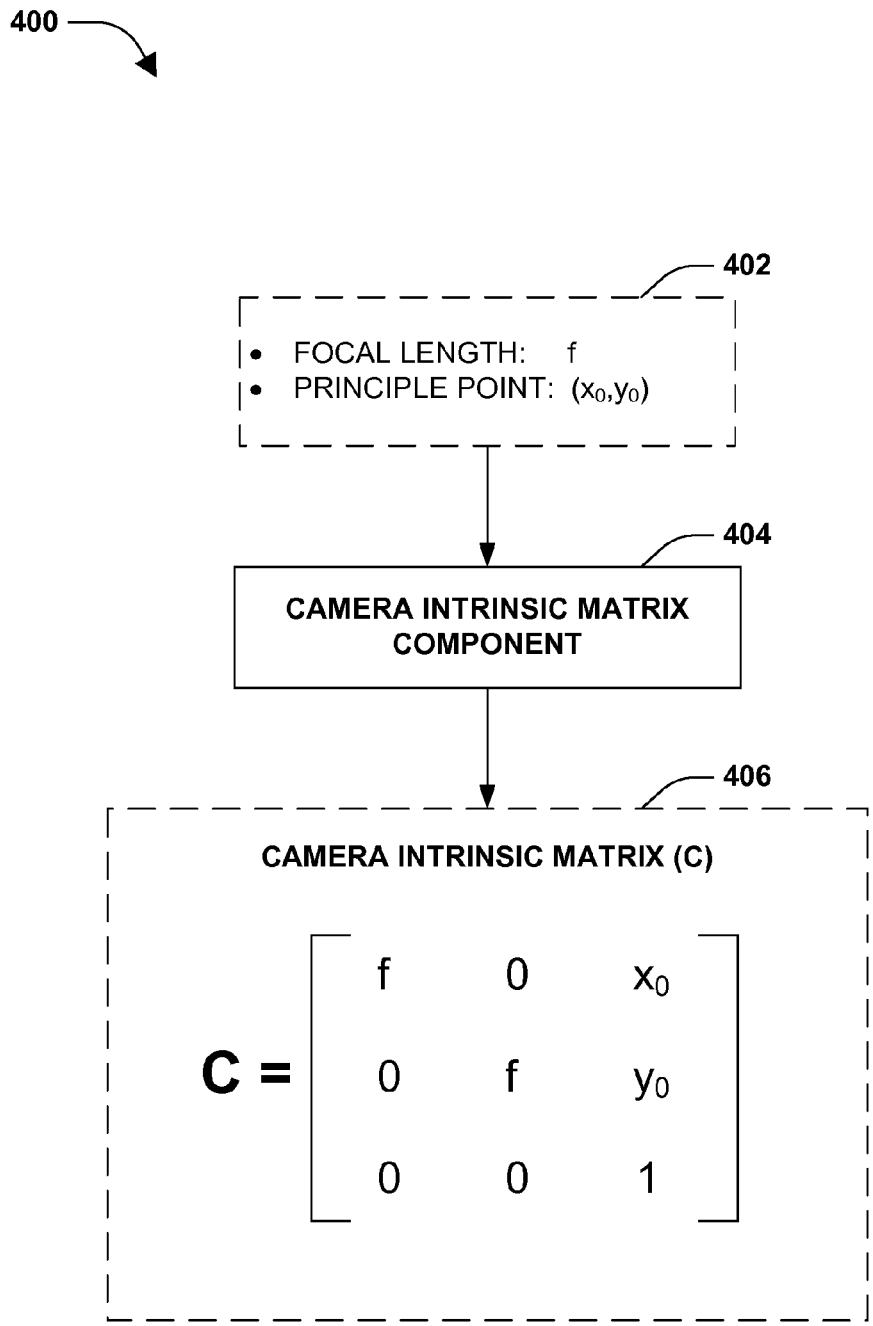
FIG. 4 is an illustration of an example of a camera intrinsic matrix.

FIG. 4 illustrates an example 400 of a camera intrinsic matrix 406. A camera intrinsic matrix component 404 may be configured to obtain the camera intrinsic matrix 406. The camera intrinsic matrix 406 may be based upon a focal length f and/or a principle point ($x_0$, $y_0$) of a camera (e.g., focal length and principle point 402). Focal length f may be expressed in pixel units, and $x_0$ and $y_0$ may correspond to coordinates of a center pixel of an image. In one example, the camera intrinsic matrix 406 may be defined as:

$$\begin{bmatrix} f & 0 & x_0 \\ 0 & f & y_0 \\ 0 & 0 & 1 \end{bmatrix}.$$

The camera intrinsic matrix 406 may be utilized to convert between image plane coordinates (x,y) and object coordinates (X,Y,Z) as follows:

$$\begin{bmatrix} x \\ y \\ 1 \end{bmatrix} = \begin{bmatrix} f & 0 & x_0 \\ 0 & f & y_0 \\ 0 & 0 & 1 \end{bmatrix} \begin{bmatrix} X \\ Y \\ Z \end{bmatrix}.$$

In this way, the camera intrinsic matrix 406 may be used to calculate a blur metric for an image using image plane coordinates (e.g., pixel coordinates of an image) derived from object coordinates.

Figure 5:
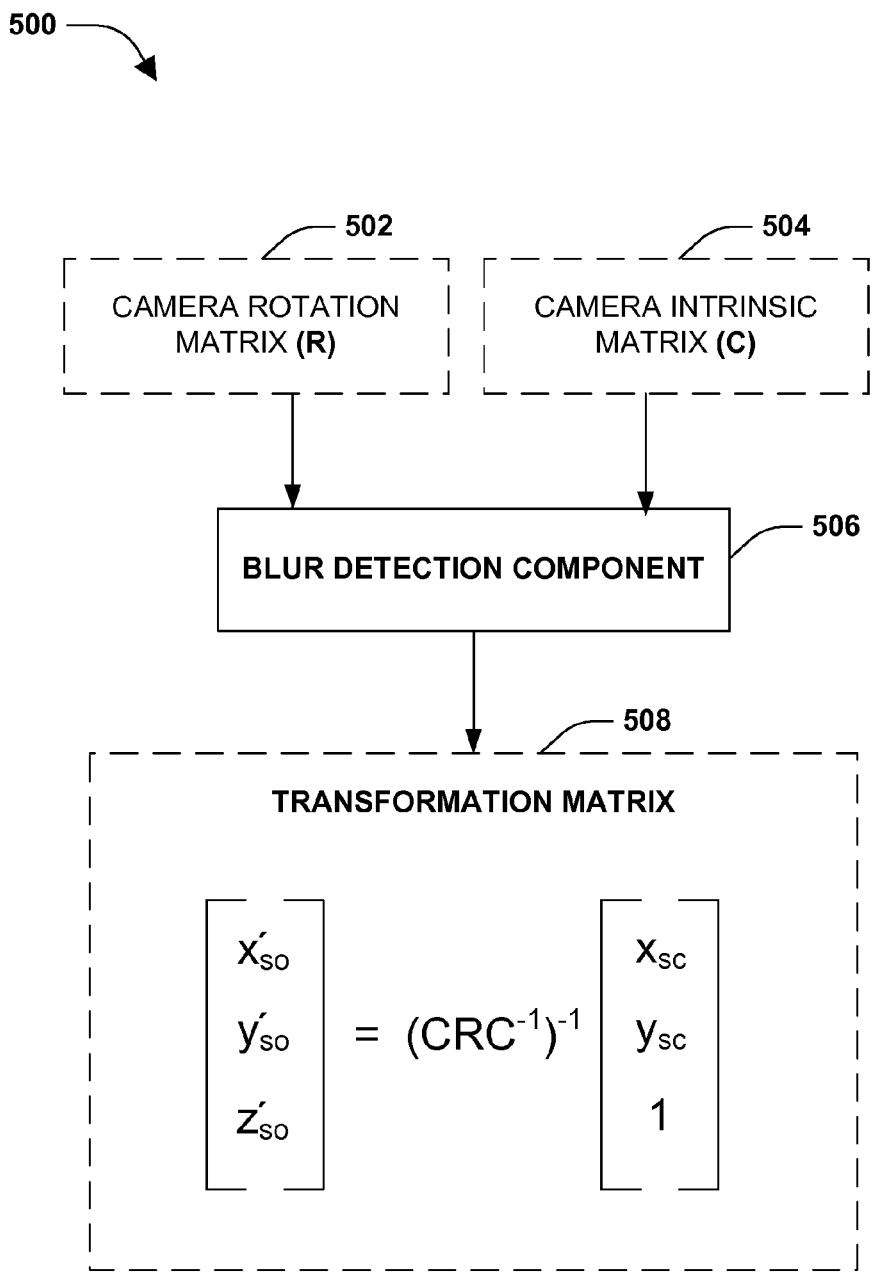
FIG. 5 is an illustration of an example of a transformation matrix.

FIG. 5 illustrates an example 500 of a transformation matrix 508. A blur detection component 506 may be configured to estimate the transformation matrix 508 based upon a camera rotation matrix 502 and/or a camera intrinsic matrix 504. In one example, the transformation matrix 508 may be defined as:

$$\begin{bmatrix} x'_{so} \\ y'_{so} \\ z'_{so} \end{bmatrix} = (CRC^{-1})^{-1} \begin{bmatrix} x_{sc} \\ y_{sc} \\ 1 \end{bmatrix}.$$

The camera rotation matrix 502 may be represented by R within the transformation matrix 508. The camera intrinsic matrix 504 may be represented by C within the transformation matrix 508. The transformation matrix 508 may be applied to ending pixel coordinates ($x_{sc}$,$y_{sc}$) of a pixel at the shutter close event to identify beginning pixel coordinates ($x_{so}$,$y_{so}$) of a pixel at the shutter open event. Beginning pixel coordinate $x_{so}$ may correspond to $x'_{so}/z'_{so}$, and beginning pixel coordinate $y_{so}$ may correspond to $y'_{so}/z'_{so}$ within the transformation matrix 508. Once identified, the beginning pixel coordinates ($x_{so}$,$y_{so}$) may be compared with the ending pixel coordinates ($x_{sc}$, $y_{sc}$) to determine a pixel distance, for example, experienced by the pixel between the shutter open event and the shutter close event. For example, the pixel displacement may be a function of a Euclidean distance defined as: displacement($x_{sc}$, $y_{sc}$)=$\sqrt{(x_{sc}-x_{so})^2+(y_{sc}-y_{so})^2}$.

Figure 6:
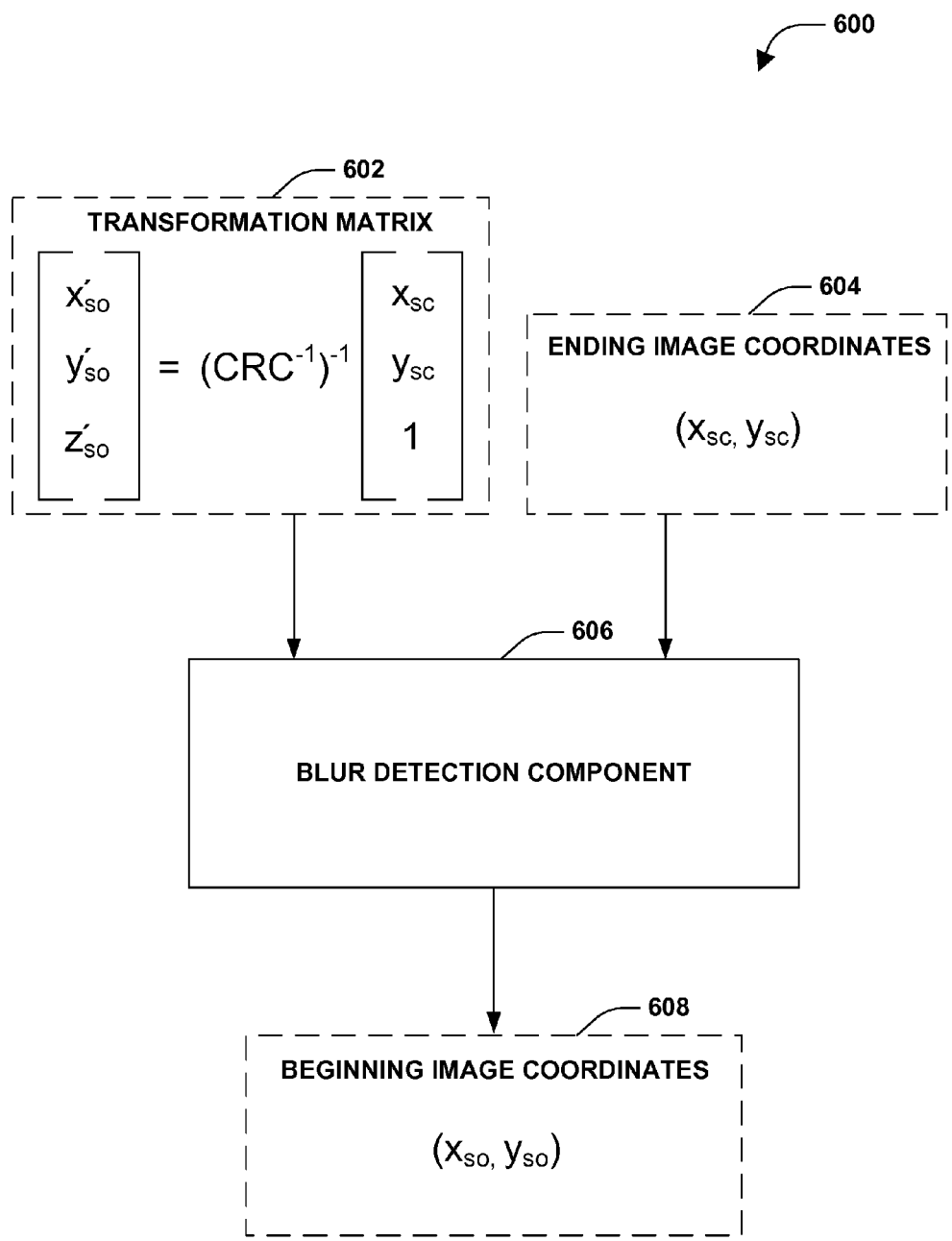
FIG. 6 is an illustration of an example of identifying beginning image coordinates $(x_{so}, y_{so})$ of a pixel at a shutter open event based upon a transformation matrix.

FIG. 6 illustrates an example 600 of identifying beginning image coordinates ($x_{so}$,$y_{so}$) 608 of a pixel at a shutter open event based upon a transformation matrix 602. A blur detection component 606 may be configured to determine a blur metric for an image captured by a camera during an exposure event (e.g., the exposure event may correspond to a shutter open event and a shutter close event for the image). The blur metric may be a function of pixel displacements of one or more pixels within the image. A pixel displacement for a pixel may be determined based upon comparing beginning image coordinates ($x_{so}$,$y_{so}$) 608 of the pixel at the shutter open event and ending image coordinates ($x_{sc}$,$y_{sc}$) 604 of the pixel at the shutter close event. The ending image coordinates ($x_{sc}$,$y_{sc}$) 604 of the pixel at the shutter close event may be evident from the image captured by the camera. However, the beginning image coordinates ($x_{so}$,$y_{so}$) 608 may not be apparent from the image. Accordingly, the blur detection component 606 may identify the beginning image coordinates ($x_{so}$,$y_{so}$) 608 using the transformation matrix 602 defined as:

$$\begin{bmatrix} x'_{so} \\ y'_{so} \\ z'_{so} \end{bmatrix} = (CRC^{-1})^{-1} \begin{bmatrix} x_{sc} \\ y_{sc} \\ 1 \end{bmatrix},$$

where C represents a camera intrinsic matrix and R represents a camera rotation matrix used to estimate the transformation matrix 602.

In one example, the blur detection component 606 may apply the transformation matrix 602 to the ending image coordinates ($x_{sc}$,$y_{sc}$) 604 to identify the beginning image coordinates ($x_{so}$,$y_{so}$) 608. Beginning pixel coordinate $x_{so}$ may correspond to $x'_{so}/z'_{so}$, and beginning pixel coordinate $y_{so}$ may correspond to $y'_{so}/z'_{so}$ within the transformation matrix 602. In this way, the beginning coordinates ($x_{so}$,$y_{so}$) 608 may be identified so that the blur detection component 606 may compare the beginning image coordinates ($x_{so}$,$y_{so}$) 608 with the ending image coordinates ($x_{sc}$,$y_{sc}$) 604 to determine a pixel displacement for the pixel (e.g., which may be used to determine the blur metric for the image).

Figure 7:
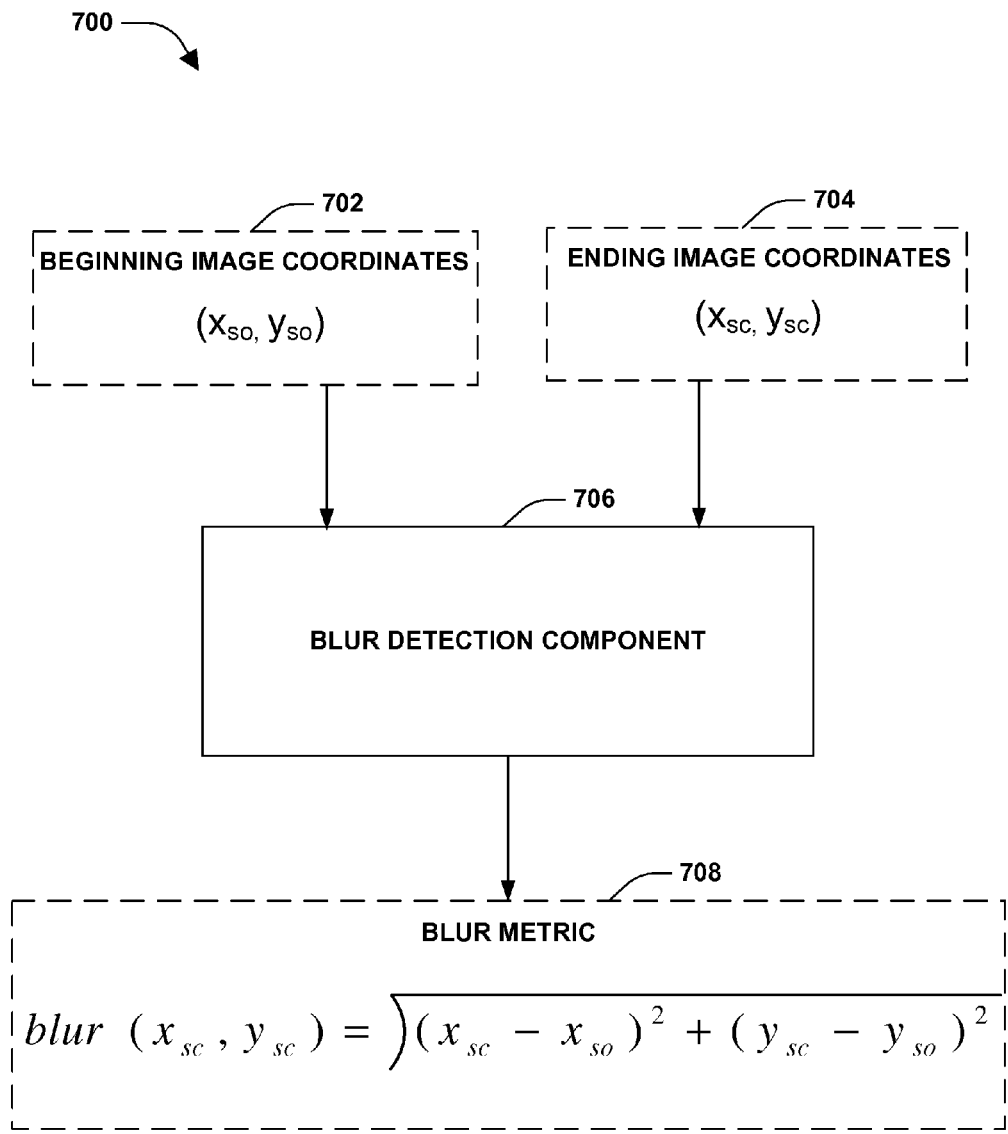
FIG. 7 is an illustration of an example of determining a blur metric.

FIG. 7 illustrates an example 700 of determining a blur metric 708 based upon a pixel displacement of a pixel. A blur detection component 706 may be configured to determine the blur metric 708 for an image captured by a camera based upon the pixel displacement of the pixel (e.g., the pixel displacement may correspond to a maximum pixel displacement for respective pixels within an image). The pixel displacement may correspond to a difference in location between a starting location of the pixel at a shutter open event (e.g., beginning image coordinates ($x_{so}$,$y_{so}$) 702) and an ending location of the pixel at a shutter close event (e.g., ending image coordinates ($x_{sc}$,$y_{sc}$) 704). In one example, the blur detection component 706 may have applied a transformation matrix to the ending image coordinates ($x_{sc}$,$y_{sc}$) to identify the beginning image coordinates ($x_{so}$,$y_{so}$) 702.

The blur detection component 706 may compare the beginning image coordinates ($x_{so}$,$y_{so}$) 702 of the pixel and the ending image coordinates ($x_{sc}$,$y_{sc}$) 704 of the pixel to determine the pixel displacement experienced by the pixel during an exposure event corresponding to the shutter open event and the shutter close event. The blur metric 708 may be a function of the pixel displacement. For example, the blur metric 708 may be a function of a Euclidean distance representing the pixel displacement, which may be defined as: $\text{blur}(x_{sc},y_{sc}) = \sqrt{(x_{sc}-x_{so})^2+(y_{sc}-y_{so})^2}$. In this way, the blur metric 708 may be determined.

Figure 8:
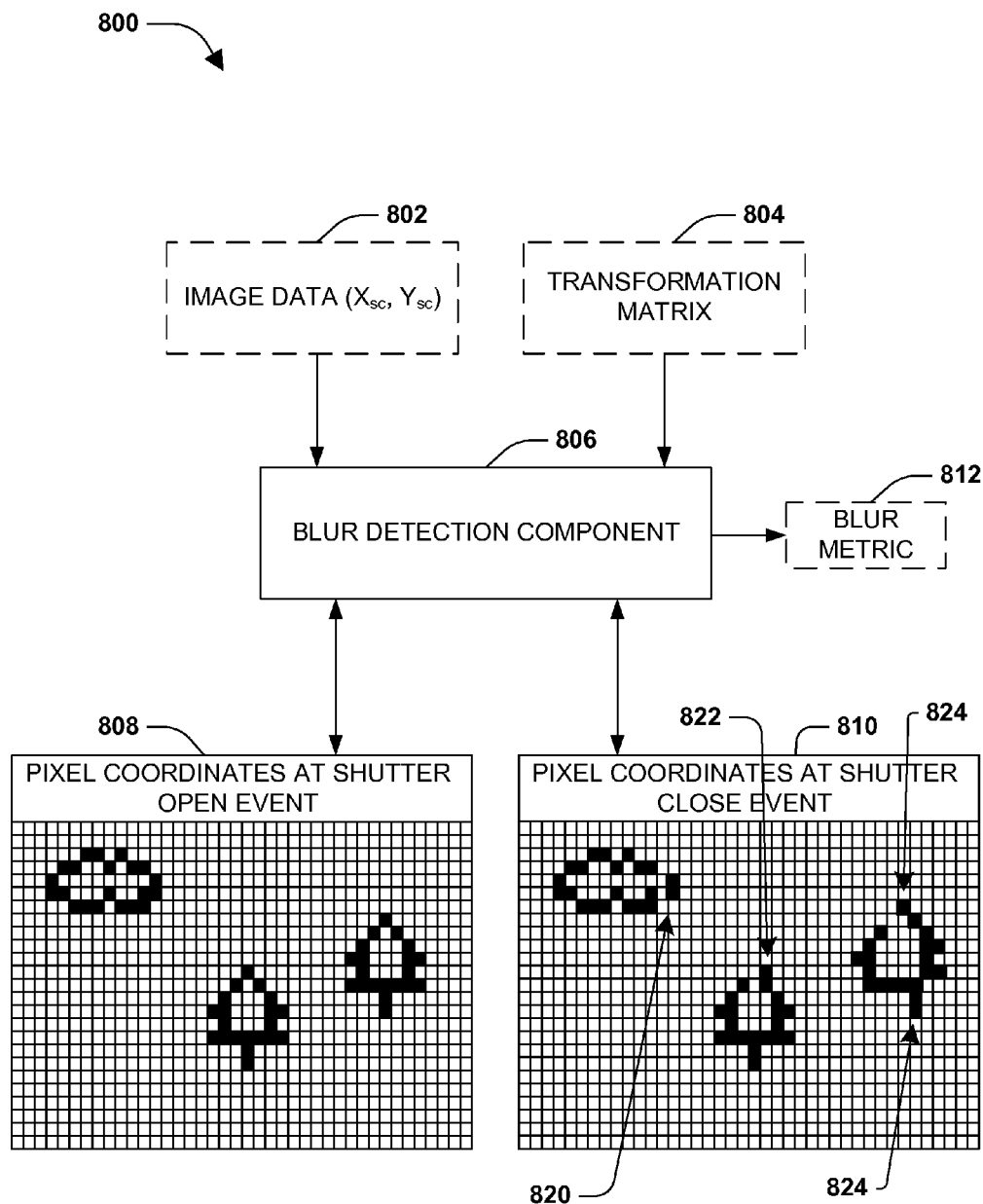
FIG. 8 is an illustration of an example of determining a blur metric for an image.

FIG. 8 illustrates an example 800 of determining a blur metric 812 for an image. Image data 802 may be associated with an image captured by a camera during an exposure event (e.g., the exposure event may correspond to a shutter open event and a shutter close event for the image). The image data 802 may correspond to pixel coordinates 810 at the shutter close event. A blur detection component 806 may be configured to apply a transformation matrix 804 to the image data 802 (e.g., ending image coordinates ($x_{sc}$,$y_{sc}$) of the pixel) to identify pixel coordinates 808 at the shutter open event (e.g., beginning image coordinates ($x_{so}$,$y_{so}$) of the pixel).

The blur detection component 806 may be configured to determine the blur metric 812 for the image based upon comparing the pixel coordinates 810 at the shutter close event and the pixel coordinates 808 at the shutter open event. The blur metric 812 may quantify blur of the image associated with displacement of pixels between the shutter open event and the shutter close event (e.g., pixels 820 on a right side of a cloud, pixels 822 on a top portion of a first tree, and pixels 824 of a second tree may be displaced to the right (e.g., or otherwise) from the shutter open event to the shutter close event).

Figure 9:
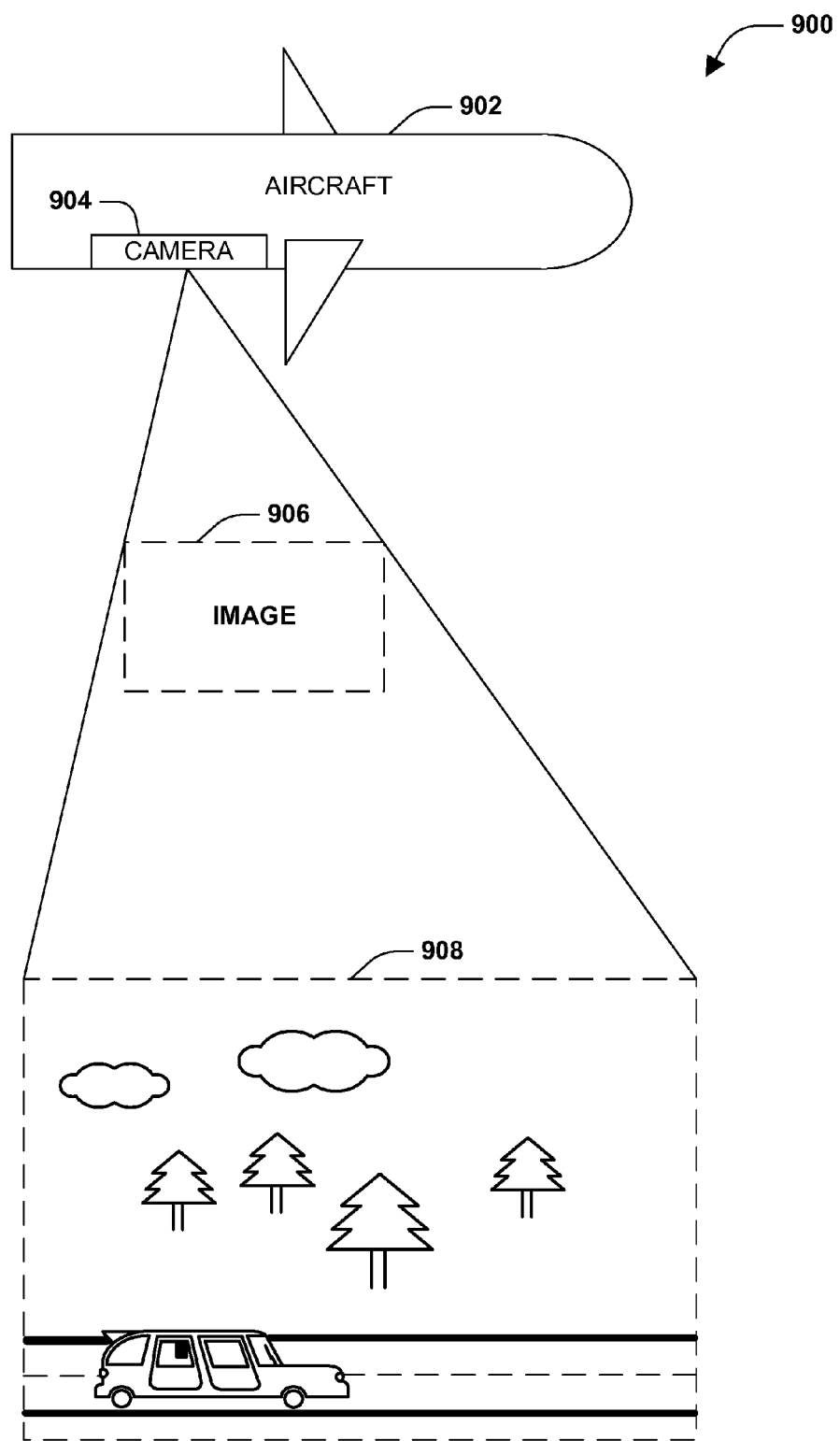
FIG. 9 is an illustration of an example of a camera associated with an aircraft.

FIG. 9 illustrates an example 900 of a camera 904 associated with an aircraft 902. The camera 904 may be configured to capture images of ground objects during flight of the aircraft 902. For example, the camera 904 may capture an image 906 of a forest road 908 during an exposure event (e.g., the exposure event may correspond to a shutter open event and a shutter close event for the image 906). Unfortunately, the camera 904 may experience motion during the exposure event, which may result in blurring within the image 906. Accordingly, it may be advantageous to quantify blur for the image 906 as a blur metric during flight of the aircraft 902. If the blur metric exceeds an acceptance threshold, then an alert may be provided to an operator of the aircraft 902. The alert may instruct the operator to recapture the forest road 908 in a new image because the image 906 may be too blurry to be useful for an intended purpose. In one example, a blur detection component may be configured to determine the blur metric for the image 906 based upon applying a transformation matrix to pixels of the image 906. In this way, blur may be quantified for the image 906 in real-time, for example.

Figure 10:
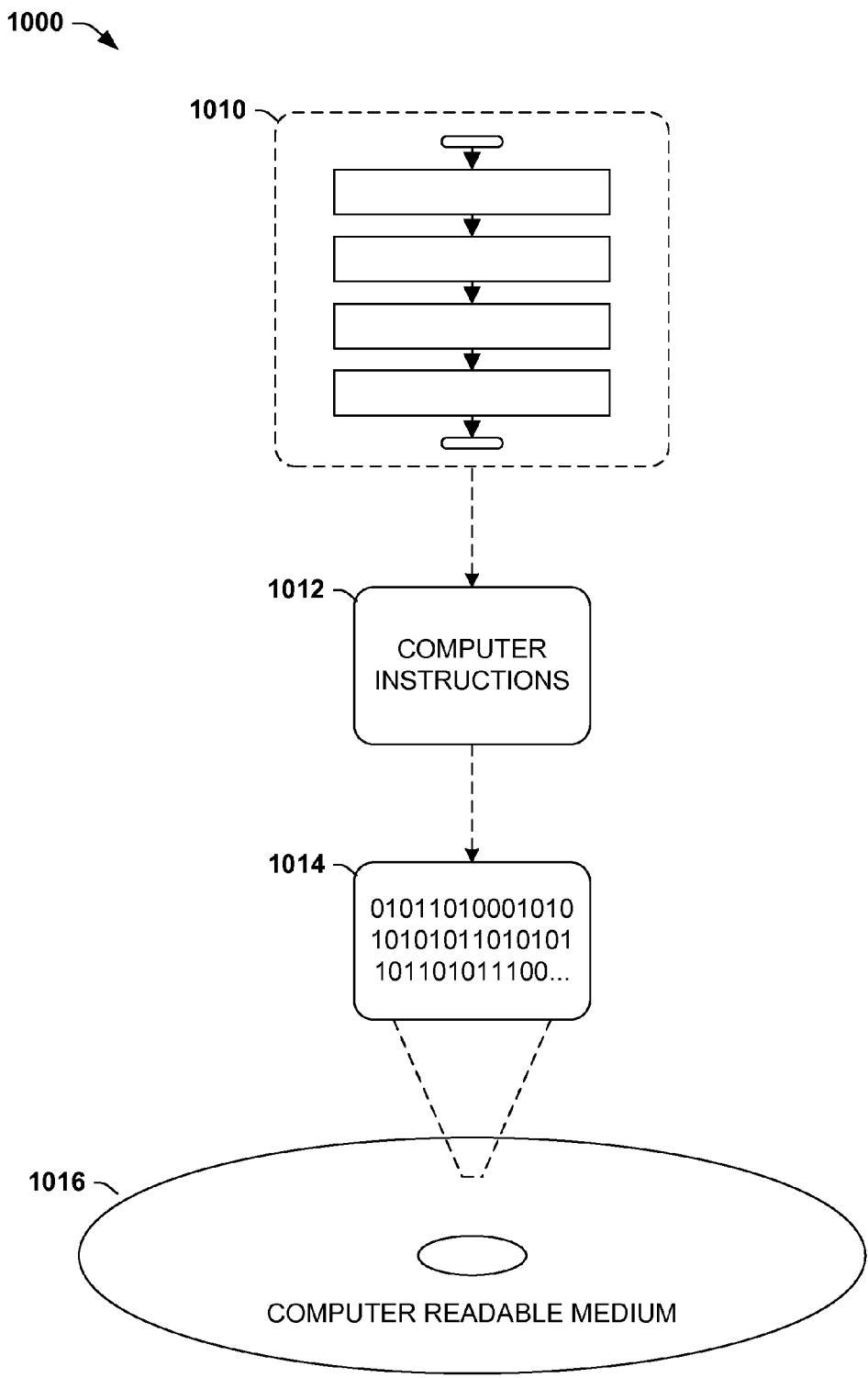
FIG. 10 is an illustration of an exemplary computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium that may be devised in these ways is illustrated in FIG. 10, wherein the implementation 1000 comprises a computer-readable medium 1016 (e.g., a CD-R, DVD-R, or a platter of a hard disk drive), on which is encoded computer-readable data 1014. This computer-readable data 1014 in turn comprises a set of computer instructions 1012 configured to operate according to one or more of the principles set forth herein. In one such embodiment 1000, the processor-executable computer instructions 1012 may be configured to perform a method 1010, such as at least some of the exemplary method 100 of FIG. 1, for example. In another such embodiment, the processor-executable instructions 1012 may be configured to implement a system, such as at least some of the exemplary system 200 of FIG. 2, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
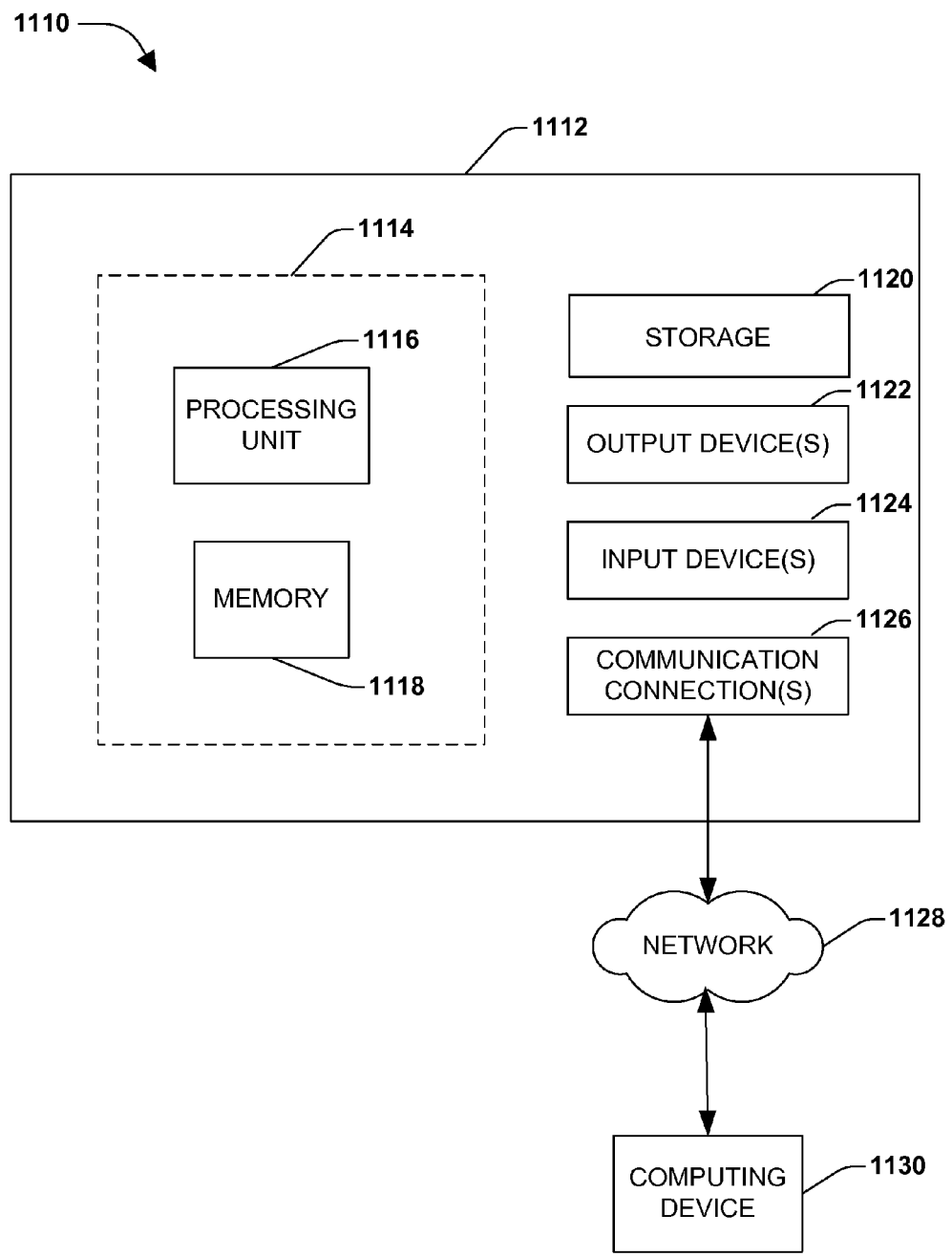
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1110 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In one embodiment, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In one embodiment, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B and/or the like generally means A or B or both A and B.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining a blur metric for an image, comprising:
   receiving motion measurement data associated with a camera;
   creating a camera rotation matrix defining an angular difference of the camera between a shutter open event and a shutter close event when generating an image based upon the motion measurement data;
   obtaining a camera intrinsic matrix comprising conversion information between image plane coordinates and object coordinates based upon a camera focal length and a principle point associated with the camera;
   estimating a transformation matrix based upon the camera rotation matrix and the camera intrinsic matrix; and
   determining a blur metric for the image based upon applying the transformation matrix to one or more pixels of the image, the blur metric quantifying blur of the image.

2. The method of claim 1, the motion measurement data generated by an inertial measurement unit (IMU).

3. The method of claim 1, the motion measurement data comprising angular motion information associated with at least one of a camera roll orientation angle, a camera pitch orientation angle, or a camera heading orientation angle.

4. The method of claim 1, the creating a camera rotation matrix comprising:
   interpolating the motion measurement data to obtain a shutter open camera orientation angle and a shutter close camera orientation angle, and creating the camera rotation matrix based upon an angular difference between the shutter open camera orientation angle and the shutter close camera orientation angle.

5. The method of claim 1, the determining a blur metric comprising:
   for a first pixel of the one or more pixels:
      applying the transformation matrix to ending image coordinates of the first pixel at the shutter close event to identify beginning image coordinates of the first pixel at the shutter open event; and
      determining a pixel displacement for the first pixel based upon the ending image coordinates and the beginning image coordinates.

6. The method of claim 5, the determining a pixel displacement comprising:
   calculating a Euclidean distance between the ending image coordinates and the beginning image coordinates.

7. The method of claim 1, the determining a blur metric comprising:
   determining the blur metric based upon a maximum pixel displacement of a first pixel of the one or more pixels.

8. The method of claim 1,
   the receiving motion measurement data comprising receiving the motion measurement data in real-time, and
   the determining a blur metric comprising determining the blur metric in real-time during operation of the camera.

9. A system for determining a blur metric for an image, comprising:
   a camera rotation matrix component configured to:
      receive motion measurement data associated with a camera; and
      create a camera rotation matrix defining an angular difference of the camera between a shutter open event and a shutter close event when generating an image based upon the motion measurement data;
   a camera intrinsic matrix component configured to:
      obtain a camera intrinsic matrix comprising conversion information between image plane coordinates and object coordinates based upon a camera focal length and a principle point associated with the camera; and
   a blur detection component configured to:
      estimate a transformation matrix based upon the camera rotation matrix and the camera intrinsic matrix; and
      determine a blur metric for the image based upon applying the transformation matrix to one or more pixels of the image, the blur metric quantifying blur of the image.

10. The system of claim 9, the motion measurement data comprising angular motion information associated with at least one of a camera roll orientation angle, a camera pitch orientation angle, or a camera heading orientation angle.

11. The system of claim 9, the camera rotation matrix component configured to:
- interpolate the motion measurement data to obtain a shutter open camera orientation angle and a shutter close camera orientation angle; and
- create the camera rotation matrix based upon an angular difference between the shutter open camera orientation angle and the shutter close camera orientation angle.

12. The system of claim 9, the blur detection component configured to:
- for a first pixel of the one or more pixels:
  - apply the transformation matrix to ending image coordinates of the first pixel at the shutter close event to identify beginning image coordinates of the first pixel at the shutter open event; and
  - determine a pixel displacement for the first pixel based upon the ending image coordinates and the beginning image coordinates.

13. The system of claim 12, the blur detection component configured to:
- calculate a Euclidean distance between the ending image coordinates and the beginning image coordinates to determine the pixel displacement.

14. The system of claim 9, the blur detection component configured to:
- determine the blur metric based upon a maximum pixel displacement of a first pixel of the one or more pixels.

15. The system of claim 9, the blur detection component configured to:
- determine the blur metric in real-time during operation of the camera.

16. The system of claim 9, the motion measurement data generated by an inertial measurement unit (IMU).

17. A computer readable storage device comprising instructions that when executed perform a method for determining a blur metric for an image, comprising:
- obtaining a camera rotation matrix associated with an image;
- obtaining a camera intrinsic matrix associated with a camera used to acquire the image;
- estimating a transformation matrix based upon the camera rotation matrix and the camera intrinsic matrix; and
- determining a blur metric for the image based upon applying the transformation matrix to one or more pixels of the image, the blur metric quantifying blur of the image, the determining a blur metric comprising:
  - for a first pixel of the image:
    - applying the transformation matrix to ending image coordinates of the first pixel at a shutter close event to identify beginning image coordinates of the first pixel at a shutter open event; and
    - determining a pixel displacement for the first pixel based upon the ending image coordinates and the beginning image coordinates.

18. The computer readable storage device of claim 17, the camera rotation matrix based upon motion measurement data comprising angular motion information associated with at least one of a camera roll orientation angle, a camera pitch orientation angle, or a camera heading orientation angle.

19. The computer readable storage device of claim 17, the determining a pixel displacement comprising:
- calculating a Euclidean distance between the ending image coordinates and the beginning image coordinates.

20. The computer readable storage device of claim 17, the camera rotation matrix based upon motion measurement data generated by an inertial measurement unit (IMU).

* * * * *